United States Patent
Jovicevic

(10) Patent No.: US 8,459,748 B2
(45) Date of Patent: Jun. 11, 2013

(54) VEHICLE SEAT ASSEMBLY

(75) Inventor: Niko Jovicevic, Novi, MI (US)

(73) Assignee: Nissan North America, Inc., Franklin, TN (US)

( * ) Notice: Subject to any disclaimer, the term of this patent is extended or adjusted under 35 U.S.C. 154(b) by 129 days.

(21) Appl. No.: 13/004,649

(22) Filed: Jan. 11, 2011

(65) Prior Publication Data

US 2012/0175930 A1 Jul. 12, 2012

(51) Int. Cl.
*B60R 22/00* (2006.01)

(52) U.S. Cl.
USPC ................. 297/481; 297/331; 297/335

(58) Field of Classification Search
USPC ............. 297/232, 233, 331, 332, 333, 335, 297/481
See application file for complete search history.

(56) References Cited

U.S. PATENT DOCUMENTS

| | | | |
|---|---|---|---|
| 4,445,722 A | 5/1984 | Schaper | |
| 4,638,534 A | 1/1987 | Sasaki et al. | |
| 5,064,220 A * | 11/1991 | Ogawa | 280/801.1 |
| 5,236,220 A | 8/1993 | Mills | |
| 5,332,261 A * | 7/1994 | Siepierski | 280/801.1 |
| 5,671,948 A | 9/1997 | Susko et al. | |
| 7,073,823 B2 | 7/2006 | Morino et al. | |
| 7,178,876 B2 * | 2/2007 | Borgward et al. | 297/481 |
| 7,229,135 B2 * | 6/2007 | Hyatt et al. | 297/481 |
| 7,517,008 B2 * | 4/2009 | Ebel | 297/14 |
| 7,731,296 B2 * | 6/2010 | Tsuda et al. | 297/482 |

FOREIGN PATENT DOCUMENTS

JP       02-095953 A    4/1990

* cited by examiner

*Primary Examiner* — David Dunn
*Assistant Examiner* — Timothy J Brindley
(74) *Attorney, Agent, or Firm* — Global IP Counselors, LLP

(57) ABSTRACT

A vehicle seat assembly includes a frame member, a seat bottom and a buckle assembly. The seat bottom is coupled to the frame member for pivotal movement within a movement range defined between a seating position and a retracted position in which the seat bottom angles upward. The buckle assembly includes a buckle arm and a seatbelt buckle. The buckle arm includes a first end coupled to the frame member for pivotal movement between a seating position corresponding to the seating position of the seat bottom and a retracted position corresponding to the retracted position of the seat bottom. The seatbelt buckle is coupled to a second end of the buckle arm. The buckle assembly is configured to pivot in response to pivoting movement of the seat bottom with the majority of the seatbelt buckle being maintained within the cutout throughout all of the movement range of the seat bottom.

24 Claims, 13 Drawing Sheets

VEHICLE SEAT ASSEMBLY

BACKGROUND

1. Field of the Invention

The present invention generally relates to a vehicle seating assembly. More specifically, the present invention relates to vehicle seating assembly that includes a seatbelt buckle assembly that moves with a seat bottom of the seat assembly, but is not directly attached to the seat bottom.

2. Background Information

Seatbelt assemblies have been required in vehicles for many years. Seatbelt assemblies typically include an elongated seatbelt, a tongue member and a seatbelt buckle. The seatbelt is typically attached at one end to a structural member within the vehicle adjacent to the vehicle seat. A second end of the seatbelt is typically attached to a spring located reel that releasably retains the seatbelt, locking the seatbelt against movement when the vehicle is in motion. The tongue member is typically moveably disposed on the seatbelt. The seatbelt buckle typically includes a latching mechanism that releasably engages the tongue member such that the tongue member fixes the seatbelt to the seatbelt buckle. Typically seatbelt buckle is securely coupled to a passenger compartment floor adjacent to a seat assembly. However, when the seat assembly is movable and the belt buckle remains fixed to the floor, the seatbelt buckle may not be conveniently located for attachment to the seatbelt.

SUMMARY

It has been discovered that in order for a seatbelt buckle to remain conveniently located relative to a moveable vehicle seat assembly, the seatbelt buckle should be attached to a structural member of the vehicle seat assembly.

One object of the vehicle seating apparatus is to provide a seatbelt buckle configuration that moves with a seat bottom, but is not fixed to the seat bottom.

In view of the state of the known technology, in one aspect, a vehicle seat assembly includes a frame member, a seat bottom and a buckle assembly. The seat bottom is coupled to the frame member for pivotal movement about a first axis within a movement range defined between a seating position and a retracted position in which the seat bottom angles upward away from the seating position. The seat bottom also includes a cutout. The buckle assembly includes a buckle arm and a seatbelt buckle. The buckle arm includes a first end coupled to the frame member for pivotal movement about a second axis between a seating position corresponding to the seating position of the seat bottom and a retracted position corresponding to the retracted position of the seat bottom. The seatbelt buckle is coupled to a second end of the buckle arm. The buckle assembly is configured to pivot in response to pivoting movement of the seat bottom with the majority of the seatbelt buckle being maintained within the cutout throughout all of the movement range of the seat bottom.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
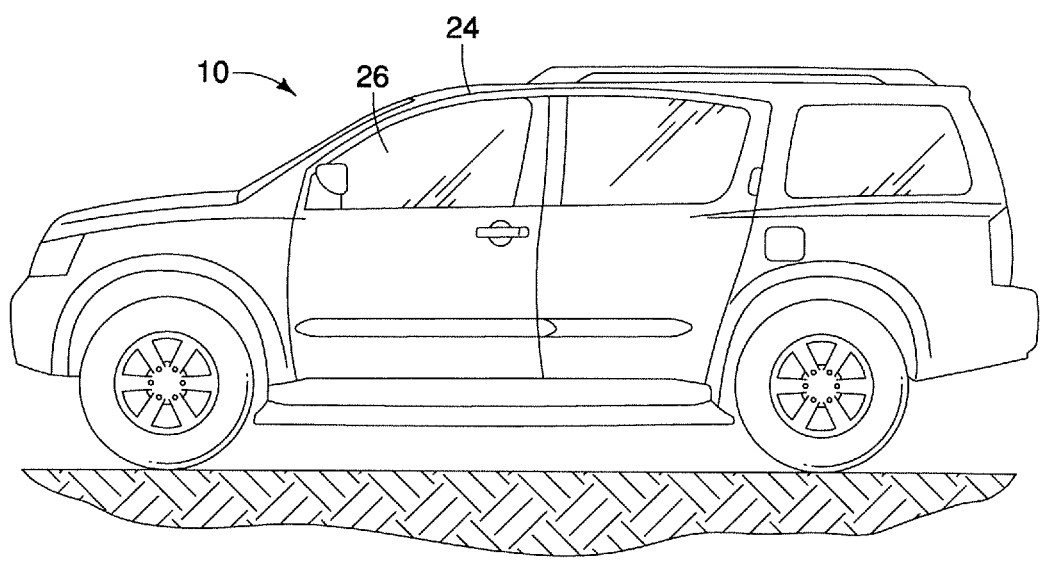
FIG. 1 is a side elevation view of a vehicle that includes a seating apparatus in accordance with a first embodiment.
Figure 2:
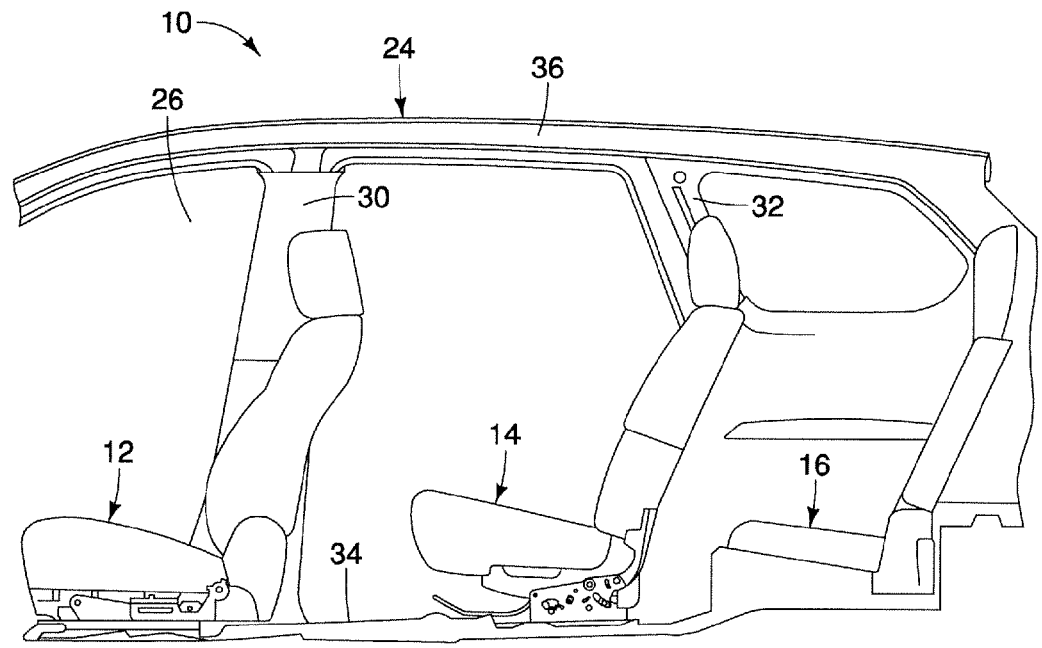
FIG. 2 is a cutaway side view of a passenger compartment of the vehicle depicted in FIG. 1, showing a row of front seats, a movable seat assembly and a rear seat assembly all oriented in a seating position ready to receive passengers in accordance with the first embodiment.
Figure 3:
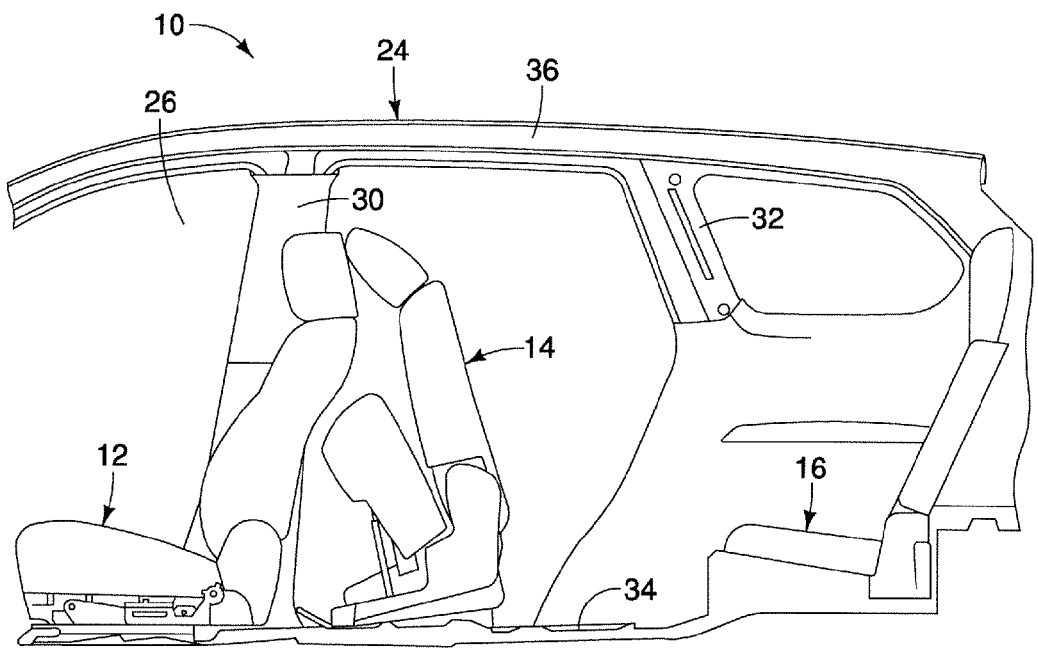
FIG. 3 is another cutaway side view of a passenger compartment of the vehicle similar to FIG. 2, showing a seat bottom of the movable seat assembly pivoted to a retracted position and the movable seat assembly also moved forward toward the row of front seats and away from the rear seat assembly in accordance with the first embodiment.

Referring initially to FIG. 1, a vehicle 10 is illustrated in accordance with a first embodiment. As shown in FIGS. 2 and 3, the vehicle 10 has a first row of seats 12, a movable seat assembly 14 and a rear seat assembly 16. The movable seat assembly 14 includes a plurality of seatbelt buckle assemblies 20 (shown in FIGS. 5, and 7-15) that are described in greater detail below.

A description of the vehicle 10 is now provided with specific reference to FIGS. 1, 2 and 3. The vehicle 10 includes a vehicle structure 24 that defines passenger compartment 26. As indicated in FIGS. 2 and 3, the vehicle structure 24 includes B-pillars 30 (only one B-pillar is shown in FIGS. 2 and 3), C-pillars 32 (only one C-pillar is shown in FIGS. 2 and 3), a floor 34 and a roof 36. Since the various elements of the vehicle structure 24 are conventional in nature, further description is omitted for the sake of brevity.

The vehicle 10 is, for example, a sports utility vehicle (SUV) that includes at least the front row of seats 12, the movable seat assembly 14 and can optionally include the rear seat assembly 16, as shown in the drawings. Alternatively, the vehicle 10 can include a cargo space behind the movable seat assembly 14 instead of the rear seat assembly 16. In other words, the rear seat assembly 16 can be removed, folded down (not shown) or eliminated from the vehicle 10 completely in order to provide a cargo space behind the movable seat assembly 14.

As indicated by comparing FIGS. 2 and 3, the moveable seat assembly 14 can be moved between a deployed (or seating) orientation (FIG. 2) and a tilted orientation (FIG. 3). As shown in FIG. 3, with the movable seat assembly 14 in the tilted (or retracted) orientation, there is greater access through the passenger rear door openings (between the B-pillar 30 and C-pillar 32) to the rear seat assembly 16 (or cargo area).

Figure 4:
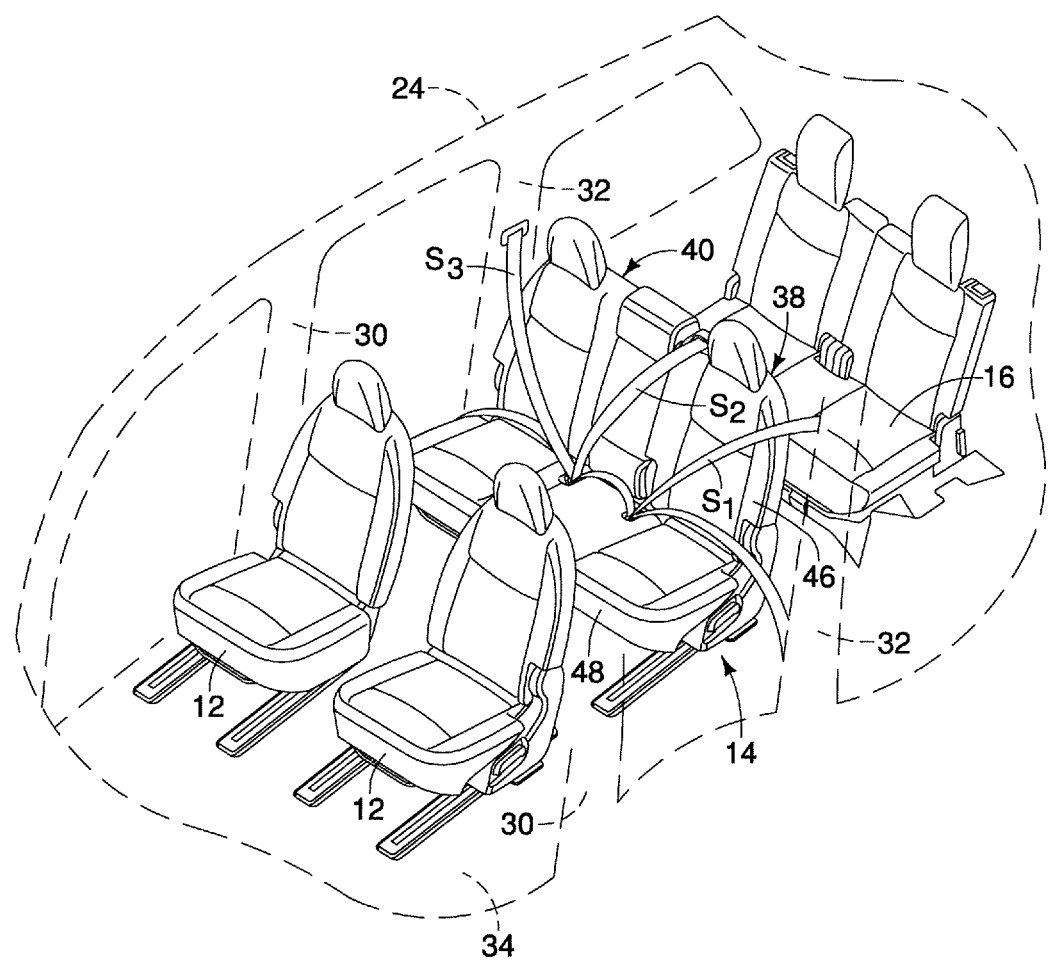
FIG. 4 is a perspective view of the passenger compartment showing the various seats and seatbelts of the movable seat assembly in accordance with the first embodiment.
Figure 5:
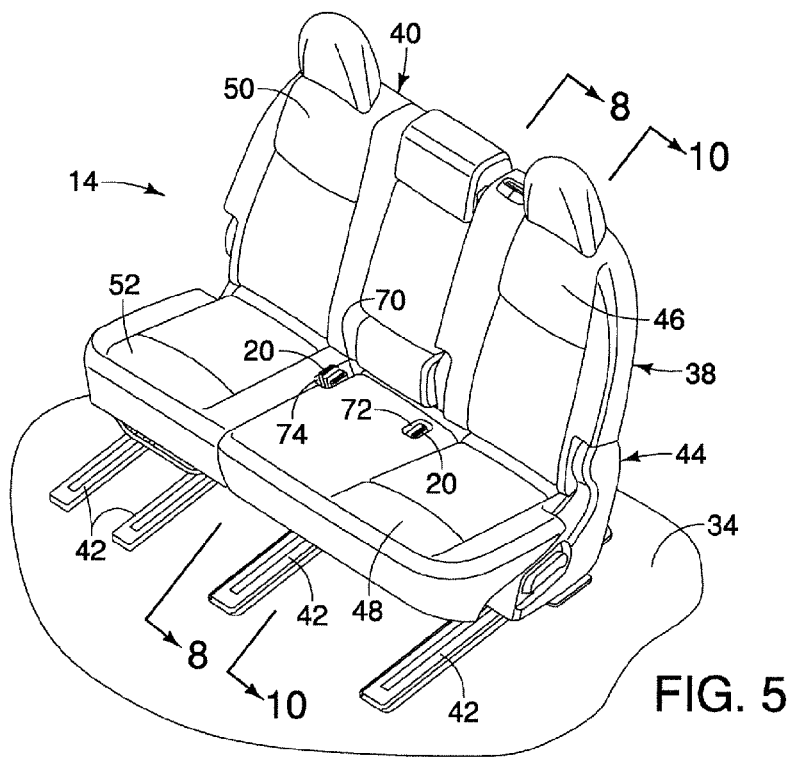
FIG. 5 is a perspective view of the movable seat assembly showing a 60/40 seating arrangement, with the seat bottom divided into a first bottom section and a second bottom section, with both the first and second bottom sections shown in seating positions in accordance with the first embodiment.
Figure 6:
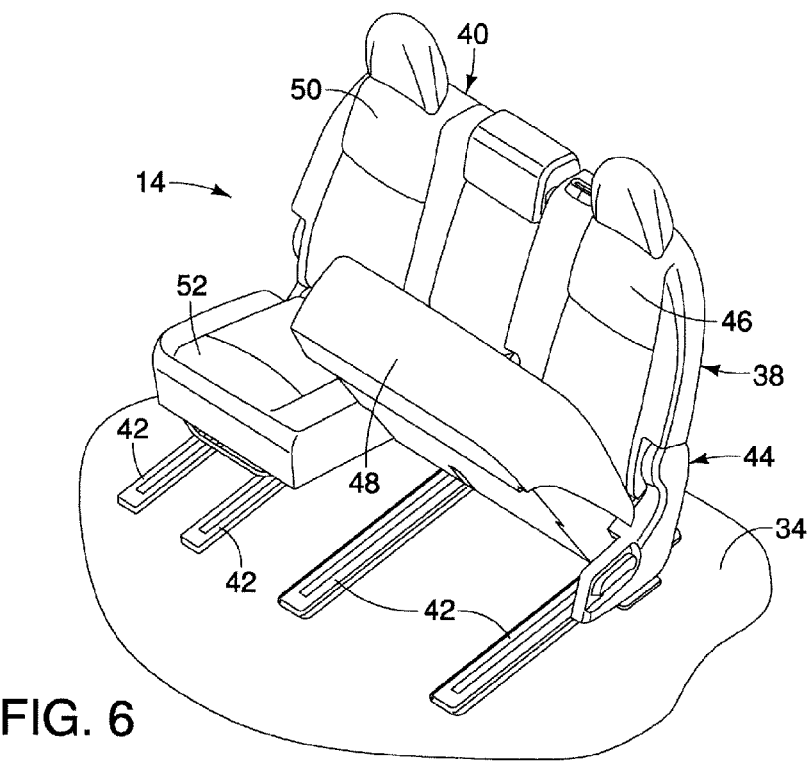
FIG. 6 is another perspective view of the movable seat assembly similar to FIG. 5, showing the first bottom section in the retracted position or raised position, making possible increased movement of the movable seat assembly toward the row of front seats in accordance with the first embodiment.

A description of the movable seat assembly 14 is now provided with specific reference to FIGS. 4 thru 11. The movable seat assembly 14 includes a first sub-assembly 38 and a second sub-assembly 40. As best shown in FIGS. 5 and 6, the first sub assembly 38 includes a pair of tracks 42, a seat frame 44, a first seatback section 46, a first bottom section 48, and the buckle assemblies 20.

As shown in FIG. 4, the movable seat assembly 14 has associated with it, seatbelts $S_1$, $S_2$ and $S_3$. The seatbelt $S_1$ has a first end that is fixed to the adjacent C-pillar 32 or the roof 36 in a conventional manner and a second end fixed either to the floor 34 or the bottom of the C-pillar 32 in a conventional manner. The seatbelt $S_2$ has a first end that is fixed within the first seatback section 46 of the first sub-assembly 38 or the roof 36 in a conventional manner and a second end fixed to either a portion of the seat frame 44 or the floor 34 in a conventional manner. The seatbelt $S_3$ has a first end that is fixed to either the adjacent C-pillar 32 or the roof 36 in a conventional manner and a second end fixed either to the floor 30 or the bottom of the C-pillar 32 in a conventional manner. Each of the seatbelts $S_1$, $S_2$ and $S_3$ includes a seatbelt tongue member that is releasably retained by a respective one of the buckle assemblies 20 in a conventional manner. Since the seatbelts $S_1$, $S_2$ and $S_3$ and the seatbelt tongue member are conventional, further description is omitted for the sake of brevity.

As also indicated in FIGS. 5 and 6, the second sub-assembly 40 includes a seat frame (not shown), another pair of the tracks 42, a second seatback section 50, a second bottom section 52 and one buckle assembly 20. Only selected portions of the second sub-assembly 40 of the movable seat assembly 14 are provided below, since description of features of the first sub-assembly 38 also applies to the second sub-assembly 40. Therefore, a more detailed description of the second sub-assembly 40 is omitted for the sake of brevity. Instead, the description below focuses on the features of the first sub-assembly 38.

As is shown in the drawings, the first sub-assembly 38 and the second sub-assembly 40 are dimensioned such that the movable seat assembly 14 is divided into two sections conventionally referred to as a 60-40 arrangement. Specifically, the first sub-assembly 38 constitutes approximately 60 percent of the overall seating space of the moveable seat assembly 14. The second sub-assembly 40 constitutes approximately 40 percent of the overall seating space of the moveable seat assembly 14. More specifically, the first sub-assembly 38 provides space for two passengers and the second sub-assembly 40 provides space for a single passenger.

Figure 7:
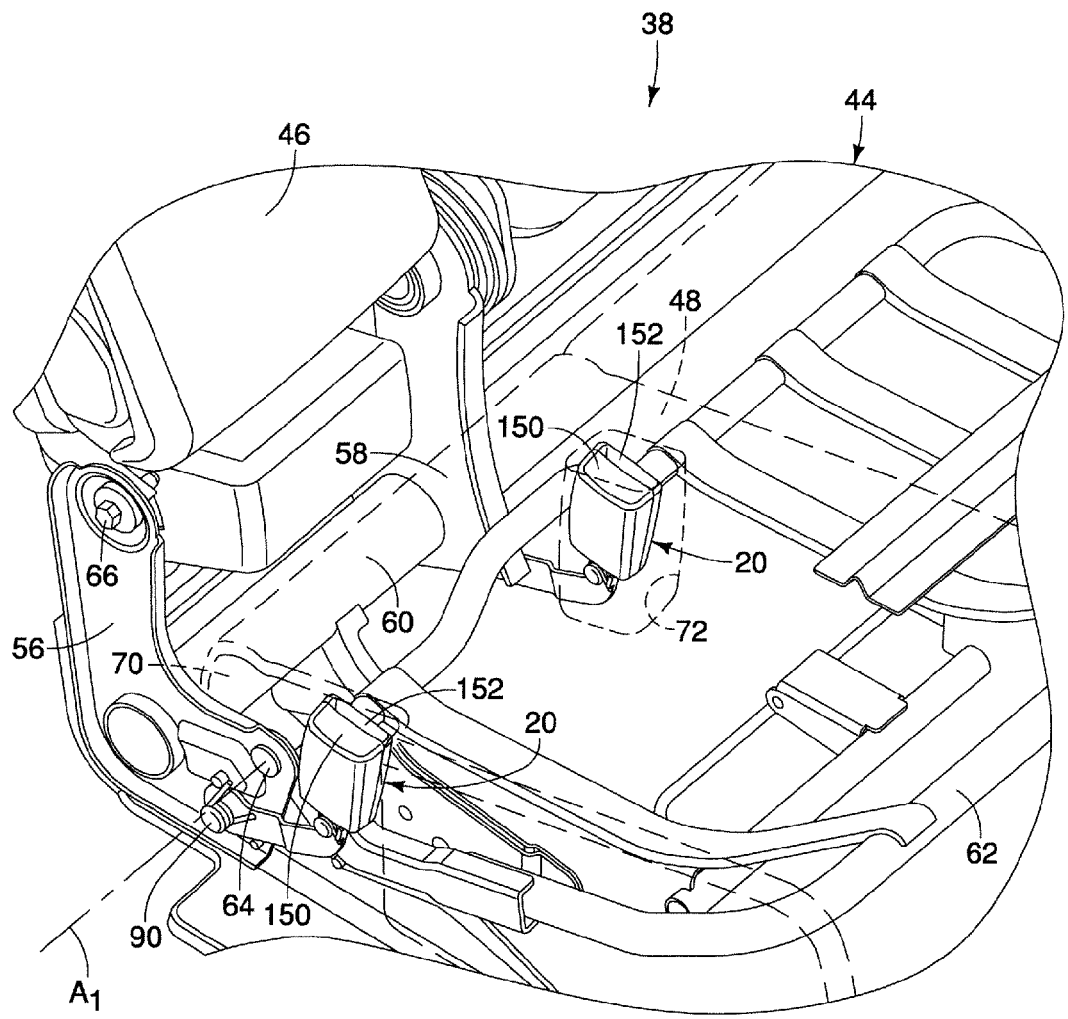
FIG. 7 is a perspective view of a section of the seat assembly, showing structural elements of the seat assembly with the first bottom section shown in phantom in accordance with the first embodiment.

A more detailed description of features of the first sub-assembly 38 is now provided with reference to FIGS. 5, 6 and 7. The tracks 42 are fixed to the floor 34 of the vehicle structure 24 by, for example, fasteners (not shown) such that the tracks 42 are rigidly connected to the floor 34. The seat frame 44 is releasably locked to the tracks 42 such that when released, the first sub-assembly 38 of the seat assembly 14 slides between the deployed (or seating) orientation depicted in FIG. 2 and the tilted (or retracted) orientation depicted in FIG. 3. The seat frame 44 (along with the first seatback section 46 and the first bottom section 48) move to the tilted (or retracted) position shown in FIG. 3 in order to provide easy access to the rear seat assembly 16 or cargo space behind the first sub-assembly 38 of the movable seat assembly 14. In the tilted (or retracted) position, the movable seat assembly 14 is slid forward away from the rear seat assembly 16 and toward and/or against the back side of the row of front seats 12.

Structure related to the sliding movement of the first sub-assembly 38 (and the second sub-assembly 40) of the movable seat assembly 14 is not believed to be necessary for understanding the present invention. Therefore, further description of those mechanisms that provide the sliding movement of the movable seat assembly 14 relative to the tracks 42 is omitted for the sake of brevity. However, description of one example of a structural arrangement that provides sliding movement to the movable seat assembly 14 can be found in co-pending U.S. application Ser. No. 12/976,713, filed Dec. 22, 2010 and commonly assigned with the instant application.

As best shown in FIG. 7, the seat frame 44 includes a first bracket 56 (a frame member), a second bracket 58 (another frame member) a beam 60 and a seat bottom support frame 62. The first bracket 56 has an L-shape and is rigidly fixed to the beam 60 by, for example, welding. The second bracket 58 is oriented to be parallel to the first bracket 56, but is spaced apart from the first bracket 56. The second bracket 58 is also rigidly fixed to the beam 60 by, for example, welding. The seat bottom support frame 62 is supported by the first bracket 56 (and another bracket not shown) for pivotal movement about pins 64 (only one pin 64 is indicated in FIG. 7). As is indicated in FIG. 7, the pins 64 define a pivot axis $A_1$ about which the first bottom section 48 pivots.

In the depicted embodiment, the beam 60 extends the width of the first seatback section 46 and the first bottom section 48 of the movable seat assembly 14. In other words, the beam 60 ties together and supports various structural members (not shown) of the seat frame 44 such that the first seatback section 46 and the first bottom section 48 move together as a single unit between the seating orientation depicted in FIG. 2 and the tilted (or retracted) orientation depicted in FIG. 3. It should be understood from the drawings and the description herein that there are other structural features of the seat frame 44. However, since these other structural features are not believed to be necessary for understanding the invention, description is omitted for the sake of brevity.

In an alternative embodiment, the movable seat assembly 14 can be a single assembly where the first sub-assembly 38 and the second sub-assembly 40 move slide together as a single monolithic structure.

The first seatback section 46 is pivotal between an upright orientation (a vertical seating orientation) depicted in the drawings and a retracted orientation (horizontal retracted orientation—not shown) about an axis that extends through pivot pins 66 (only one pivot pin is shown). Similarly, the second seatback section 50 of the second sub-assembly 40 can pivot between the upright orientation and the horizontal retracted orientation. However, since the pivoting movement of the first and second seatback sections 46 and 50 is not believed to be necessary for understanding the present invention, further description is omitted for the sake of brevity.

Figure 8:
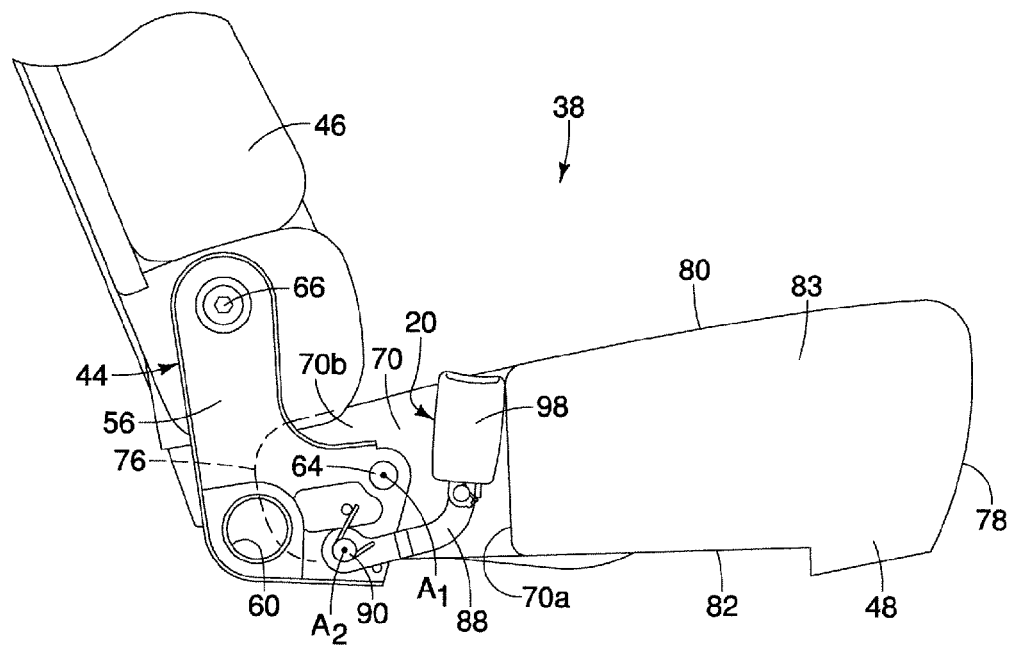
FIG. 8 is a side view of the first bottom section of the movable seat assembly taken along the line 8-8 in FIG. 5, with the second bottom section removed to reveal a recess (or cutout) in the first seat bottom, showing a buckle assembly having a buckle arm and buckle mechanism, with the buckle mechanism at least partially disposed within the recess, with the first bottom section oriented in the seating position in accordance with the first embodiment.
Figure 9:
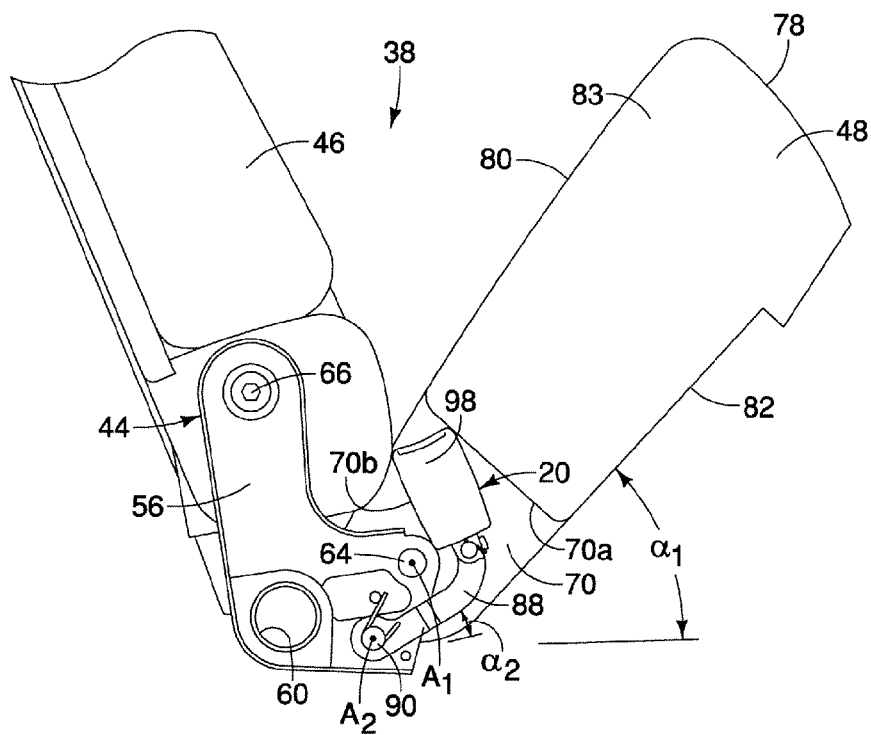
FIG. 9 is another side view of the first bottom section similar to FIG. 8, showing the first bottom section in the retracted position with the buckle arm pivoting in response to the movement of the first bottom section and the buckle mechanism pivoting relative to the buckle arm with a majority of the buckle mechanism remaining within the recess in accordance with the first embodiment.
Figure 10:
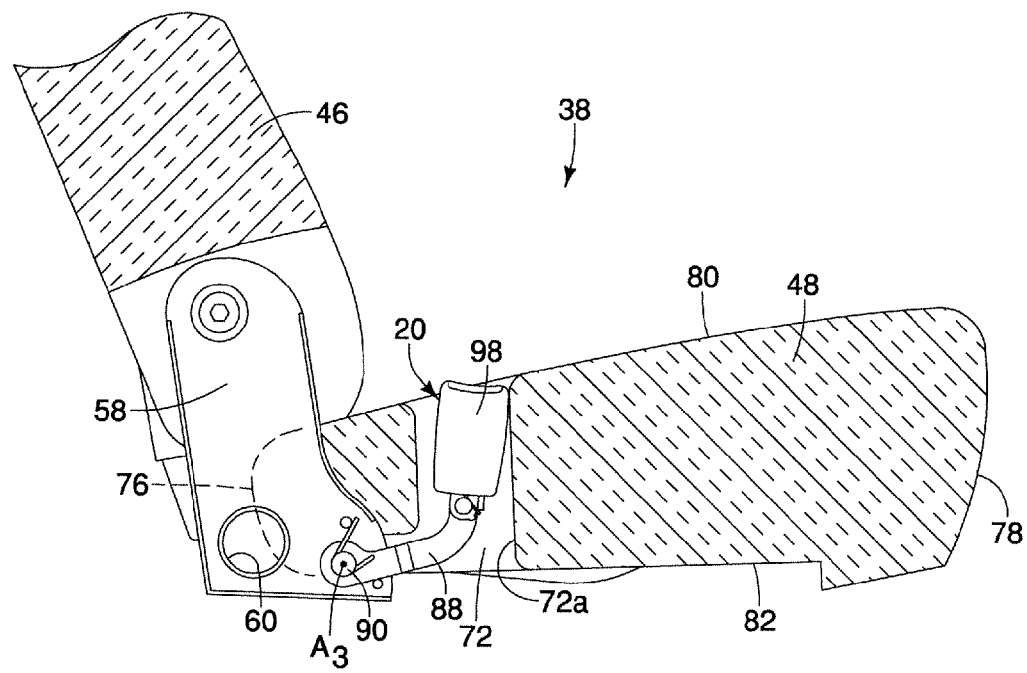
FIG. 10 is a cross-sectional view of the first bottom section taken along the line 10-10 in FIG. 5 showing an aperture (another cutout) in the first seat bottom, with another buckle assembly having a buckle arm and buckle mechanism, with the buckle mechanism at least partially disposed within the aperture, with the first bottom section oriented in the seating position in accordance with the first embodiment.
Figure 11:
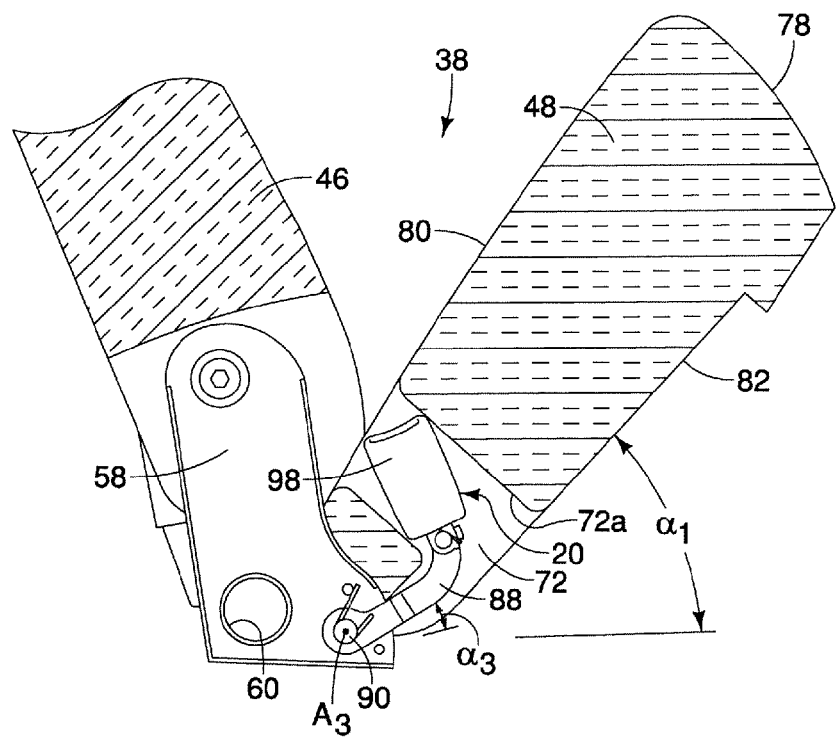
FIG. 11 is another cross-sectional view of the first bottom section similar to FIG. 10, showing the first bottom section in the retracted position with the buckle arm pivoting in response to the movement of the first bottom section and the buckle mechanism pivoting relative to the buckle arm with a majority of the buckle mechanism remaining within the aperture in accordance with the first embodiment.

A description of the first bottom section 48 is now provided with specific reference to FIGS. 5-11. The first bottom section 48 is fixed to the seat bottom support frame 62 in a conventional manner. The first bottom section 48 and the seat bottom support frame 62 pivot between a seating position (or deployed position) depicted in FIGS. 5, 8 and 10 and a retracted position depicted in FIGS. 6, 9 and 11. As indicated in FIGS. 9 and 11, the first seat bottom section 48 pivots within a movement range indicated by an angle $\alpha_1$. Further, the angle $\alpha_t$ is measured relative to movement of the first bottom section 48 with respect to the first bracket 56. It should be understood from the drawings and the description herein that the retracted position of the first bottom section 48 corresponds to the tilted orientation of the moveable seat assembly 14 as depicted in FIG. 3.

Similarly, the second bottom section 52 is separately supported by another seat bottom support frame (not shown) for movement between the seating position and the retracted position. The second bottom section 52 is configured to pivotally move independently of the first bottom section 48.

The first bottom section 48 includes two cutouts in the form of a recess 70 and an aperture 72. Similarly, the second bottom section 52 of the second sub-assembly 40 includes a recess 74 that mates with the recess 70 with the first and second sub-assemblies 38 and 40 in their respective seating positions, as shown in FIG. 5. However, since the recess 70 and recess 74 are essentially mirror images of each other that mate together, description of one (the recess 70) equally applies to the other (the recess 74). It should be understood from the drawings and the description herein that the second bottom section 52 includes the mating recess 74, completing the cutout with the recess 70, when the seatbelts $S_1$, $S_2$ and $S_3$ are arranged as shown in FIG. 4. However, there are several seatbelt configurations possible. For example, it is possible to re-arrange the seatbelts $S_1$, $S_2$ and $S_3$ such that two buckle assemblies 20 are provided in the aperture 72 and only one buckle assembly 20 is provided in the cutout formed by the recess 70 and the recess 74 (see FIGS. 16, 17 and 18). In the embodiment where only one buckle assembly 20 is provided in the cutout formed by the recess 70 and the recess 74, one of the recesses 70 or 74 can be eliminated, as indicated in the embodiment depicted in FIG. 18 and described in greater detail below.

As best shown in FIGS. 8 and 9, the first bottom section 48 extends in a lengthwise direction from a rearward edge 76 (FIG. 8 only) to a forward edge 78 thereof. The first bottom section 48 also has an upper surface 80, a lower surface 82 and a lateral edge 83. The recess 70 is formed along the lateral edge 83 (with the mating recess 74 in the second bottom section 52 completing the cutout). As indicated in FIG. 8, the rearward edge 76 intersects with the lateral edge 83, with the recess 70 extending to the rearward edge 76.

The recess 70 includes a rearward facing surface 70a and a lateral facing surface 70b that are formed on the lateral edge 83 of the seat bottom section 48. The rearward facing surface 70a defines a peripheral wall. As explained in greater detail below, the buckle assembly 20 contacts the rearward facing surface 70a (the peripheral wall).

The recess 70 is extends from the rearward edge 76 of the first bottom section 48 to a point about that is about one third of the distance between the rearward edge 76 and the forward edge 78. The recess 70 also fully extends between the upper surface 80 and the lower surface 82.

As is indicated in FIG. 5, the recess 74 of the second bottom section 52 mates with the recess 70 of the first bottom section 48 to define the cutout shown in FIG. 5. As indicated in FIGS. 5 and 7, the recess 70 has a lateral width that is sufficient to receive the buckle assembly 20. Further, the recesses 70 and 74, when mated, have a sufficient width to receive two of the buckle assemblies 20, as best indicated in FIG. 5. In other words one buckle assembly 20 can be fixed to the seat frame 44 of the first sub-assembly 38 and one buckle assembly 20 can be fixed to the seat frame (not shown) of the second sub-assembly 40. Thus, there are two buckle assemblies 20 disposed within the cutout defined by the recess 70 and the recess 74, as shown in FIG. 5. Further, the recesses 70 and 74 (the cutout) are dimensioned such that the recesses 70 and 74 (the cutout) completely encircles the seatbelt buckle of the buckle assembly 20 with the seatbelt buckle positioned within the recesses 70 and 74 (the cutout).

As shown in FIGS. 8 and 9, the buckle assembly 20 (a seatbelt buckle assembly) that is attached to the first bracket 56, moves in response to movement of the first bottom section 48 (a seat bottom) but is not directly attached to the first bottom section 48. Rather, as described in greater detail below, the buckle assembly 20 is attached to the first bracket 56 of the seat frame 44 and pivots relative to the seat frame 44.

As best shown in FIGS. 10 and 11, the aperture 72 extends between the upper surface 80 and the lower surface 82. The aperture 72 further extends from a point about one sixth of the distance away from the rearward edge 76 as measured between the rearward edge 76 and the forward edge 78 of the first bottom section 48, to a point about one third of the distance between the rearward edge 76 and the forward edge 78. The aperture 72 includes a rearward facing surface 72a. The rearward facing surface 72a defines a peripheral wall. As explained in greater detail below, the buckle assembly 20 contacts the rearward facing surface 72a (another peripheral wall).

The buckle assembly 20 that is attached to the second bracket 58 moves in response to movement of the first bottom section 48 but is not directly attached to the first bottom section 48. Rather, as described in greater detail below, the buckle assembly 20 is attached to the second bracket 58 of the seat frame 44 and pivots relative to the seat frame 44. Further, the buckle assembly 20 is configured to pivot in response to pivoting movement of the first bottom section 48 with the majority of the buckle assembly 20 being maintained within the aperture 72 throughout all of the movement range of the first bottom section 48. Further, the aperture 72 (the cutout) is dimensioned such that aperture 72 completely encircles the seatbelt buckle of the buckle assembly 20 with the seatbelt buckle positioned within aperture 72.

A description of the buckle assembly 20 is now provided with specific reference to FIGS. 12 thru 15. Other than location, the buckle assembly 20 attached to the second bracket 58 is structurally the same as the buckle assembly 20 attached to the first bracket 56. Therefore, only description of one buckle assembly 20 is provided below, with reference in the drawings to both the first bracket 56 and second bracket 58, indicating that the two buckle assemblies are interchangable.

Since all of the buckle assemblies 20 of the movable seat assembly 14 are the same or symmetrical mirror images thereof, description of one buckle assembly 20 applies to all. The buckle assembly 20 basically includes a buckle arm 88, a first pivot pin 90, a first spring 92, a bottom stop 94, a spring pin 96, friction washers $W_1$ and a seatbelt buckle 98.

The buckle arm 88 is a rigid element that is made of metal material or a rigid material that has the strength and rigidity of metal. The buckle arm 88 has a first end 100 and a second end 102. Between the first end 100 and the second end 102, the buckle arm 88 includes a curved contour such that the buckle arm 88 is not straight. The first end 100 has a first aperture 104 and a second aperture 106. The first aperture 104 can be provided with fastener receiving threads. The second end 102 of the buckle arm 88 includes a third aperture 108 and a stop projection 110.

When the buckle assembly 20 is fully assembled and installed, the first pivot pin 90 preferably extends through one of the washers $W_1$, through a coil section of the first spring 92, through first aperture 104 of the buckle arm 88, through a second of the friction washers $W_1$ and into a threaded aperture 112 of the bracket 56 of the seat frame 44. The friction washers $W_1$ are provided to allow the first spring 92 to freely flex and provide bailing force to the buckle arm 88 relative to the first pivot pin 90.

As shown in FIGS. 8 and 9, the buckle arm 88 pivots relative to the first bracket 56 about a second axis $A_2$ defined by the first pivot pin 90. The second axis $A_2$ is spaced apart from the axis $A_1$. The first axis $A_1$ is positioned at a first location relative to the first bracket 56 and the second axis $A_2$ is located at a second location relative to the first bracket 56. As is clearly shown in FIGS. 8 and 9, the second location is spaced vertically lower and horizontally rearward of the first location. In other words, the second axis $A_2$ is spaced vertically lower and horizontally rearward of the first axis $A_1$.

Further, as shown in FIGS. 8 and 9, the overall shape of the buckle arm 88 attached to the first bracket 56 is such that as the first bottom section 48 pivots about the axis $A_1$, the buckle arm 88 also pivots such that the majority of the seatbelt buckle 98 remains within the recess 70. The buckle arm 88 pivots within a movement range labeled in FIGS. 9 and 15 as angle $\alpha_2$. However, the movement range of the buckle arm 88 is not necessarily as large as the movement range of the first bottom section 48 of the first sub-assembly 38 of the movable seat assembly 14. More specifically, in the depicted embodiment, the angle $\alpha_1$ is greater than the angle $\alpha_2$.

As shown in FIGS. 10 and 11, another one of the buckle arm 88 pivots relative to the second bracket 58 about a third axis $A_3$ defined by the first pivot pin 90. The third axis $A_3$ is spaced apart from the axis $A_1$. It should be understood from the drawings and the description herein that the second axis $A_2$ and the third axis $A_3$ are not necessarily aligned with one another. More specifically, the second axis $A_2$ and the third axis $A_3$ do not coincide with one another, but rather are parallel to one another. In an alternative embodiment (not shown), it is possible for the second and third axis $A_2$ and $A_3$ to be aligned and coincide with one another. The buckle arm 88, pivotally attached to the second bracket 58, pivots within a movement range defined by an angle $\alpha_3$. The angles $\alpha_2$ and $\alpha_3$ are equal to one another in the depicted embodiment. However, in alternative embodiments, the angles $\alpha_2$ and $\alpha_3$ can be made unequal.

The first spring 92 includes the coil section but also includes a first end 114 and a second end 116. The first end 114 includes a bent portion that extends into the second aperture 106 of the first end 100 of the buckle arm 88. The second end 116 of the first spring 92 extends away from the first pivot pin 90 and is restrained against movement by contact with the spring pin 96.

Figure 13:
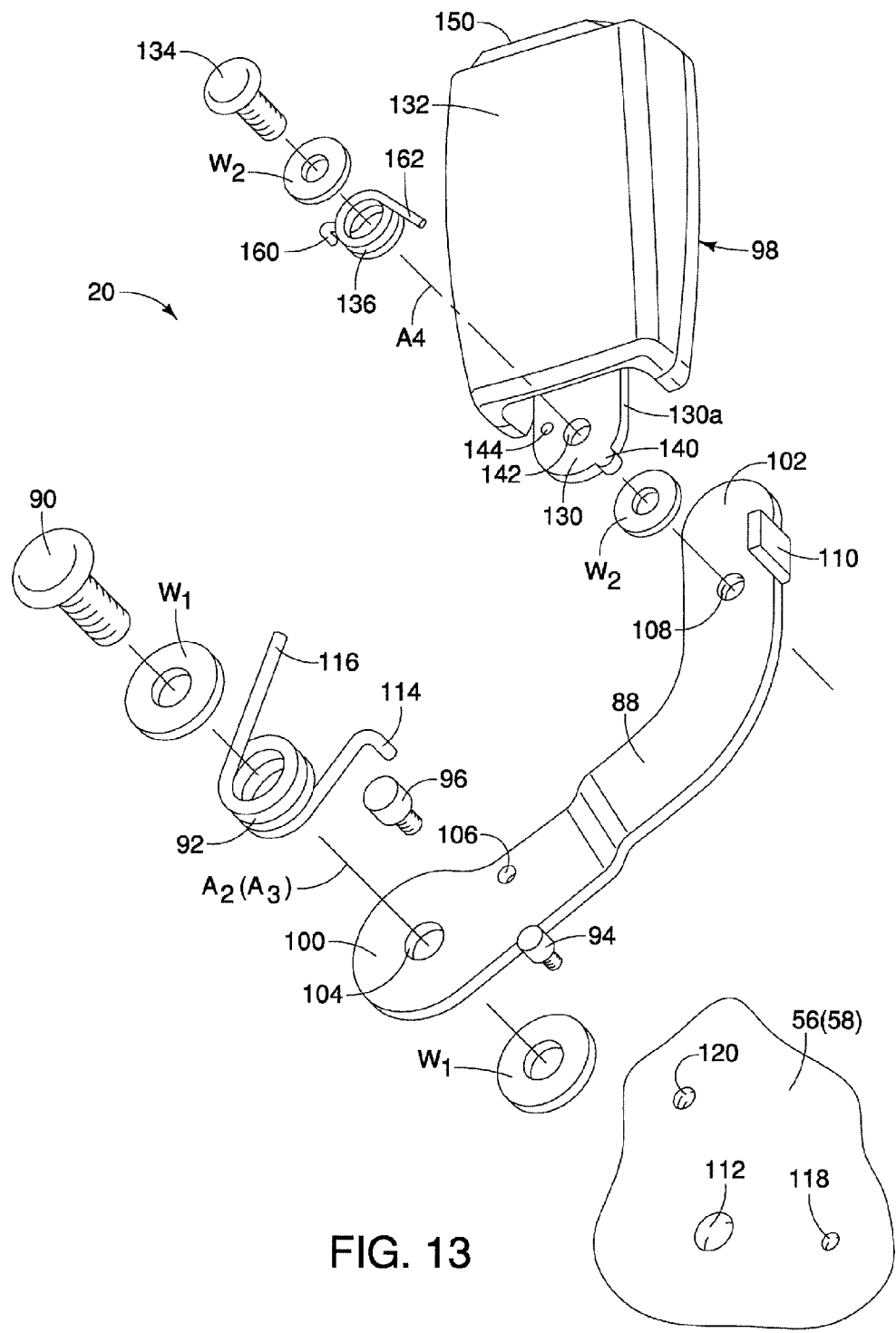
FIG. 13 is an exploded perspective view of the one of the buckle assemblies in accordance with the first embodiment.
Figure 14:
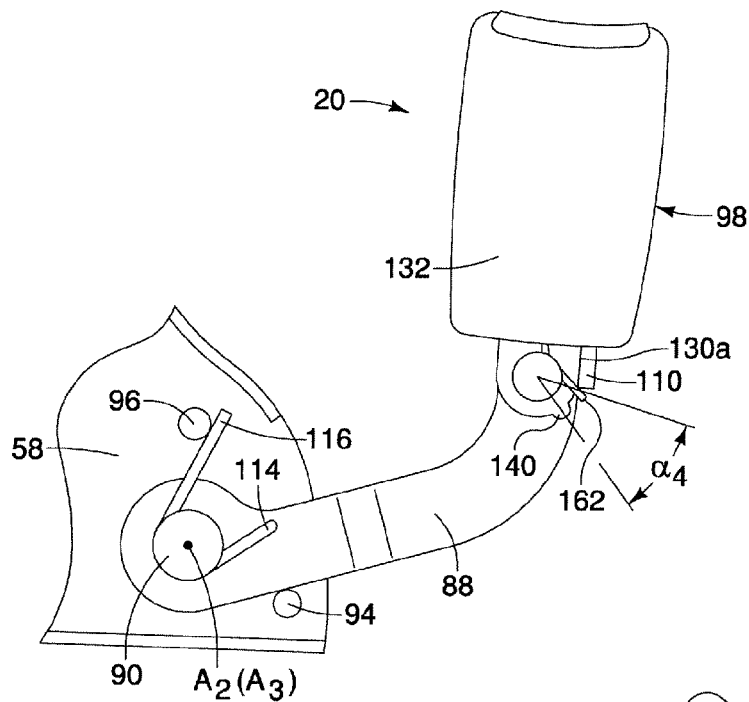
FIG. 14 is a schematic view of one of the buckle assemblies with the first bottom section removed showing the buckle arm in a first position of a pivot movement range and the buckle mechanism in a first position of a buckle movement range in accordance with the first embodiment.

As best indicated in FIG. 13, the bottom stop 94 is fixed to the bracket 56 by insertion into an aperture 118 in the bracket 56. The bottom stop 94 is basically a fastener made of a metallic material such that when the buckle arm 88 pivots, lower movement is restricted or stopped by the positioning of the bottom stop 94. The bottom stop 94 can be threaded into the aperture 118, or alternatively can be press-fitted and/or deformed upon insertion into the aperture 118 to rigidly fix the bottom stop 94 in position.

The spring pin 96 is similarly a fastener made of a metallic material such that when the buckle arm 88 pivots, the second end 116 of the first spring 92 presses against the spring pin 96 causing compression of the first spring 92. The spring pin 96 can be threaded into an aperture 120 of the bracket 56 or alternatively can be press-fitted and/or deformed upon insertion into the aperture 120 to rigidly fix the spring pin 96 in position.

The bottom stop 94 and the spring pin 96 serve as stops for the buckle arm 88. In other words, the bracket 56 includes a first stop (the bottom stop 94) and a second stop (the spring pin 96), the first stop (the bottom stop 94) being positioned to limit pivoting movement of the buckle arm 88 in a first direction and the second stop (the spring pin 96) being positioned to limit pivoting movement of the buckle arm 88 in a second direction relative to the second axis $A_2$, the first and second stops thereby defining limits of the second movement range (the angle $\alpha_2$ or the angle $\alpha_3$).

Figure 12:
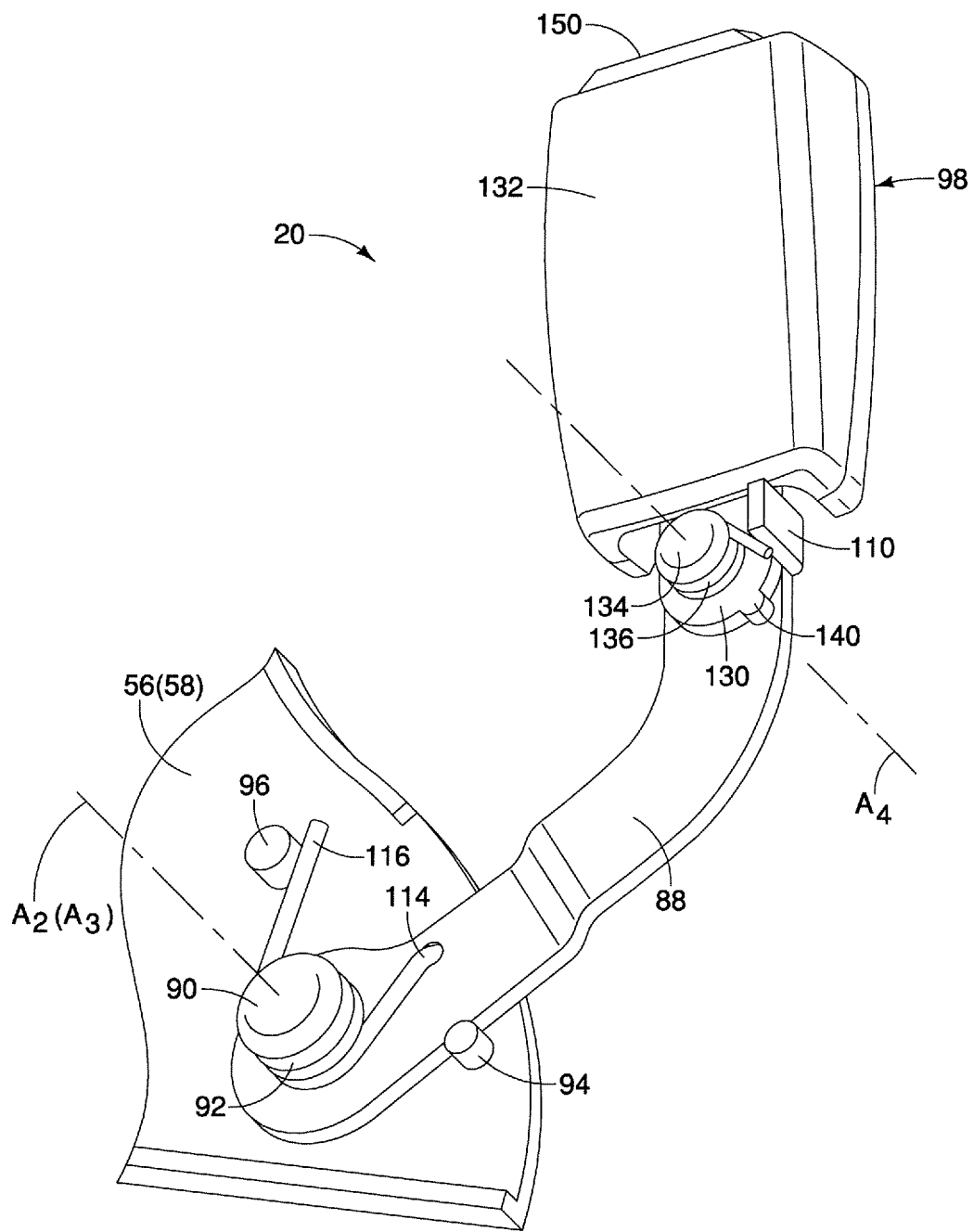
FIG. 12 is a perspective view of one of the buckle assemblies in accordance with the first embodiment.

As best shown in FIGS. 12 and 13, the seatbelt buckle 98 includes an anchor plate 130, a buckle mechanism 132 (a seatbelt buckle), a second pivot pin 134, a second spring 136 and the washers $W_2$.

As best shown in FIG. 13, the anchor plate 130 includes a stop projection 140, a first aperture 142 and a second aperture 144. The anchor plate 130 rigidly supports the buckle mechanism 132. The buckle mechanism 132 is a conventional seatbelt buckle mechanism (a latching mechanism) that releasably secures a seatbelt tongue member in a conventional manner. For example, the buckle mechanism 132 includes a release button 150 and a seatbelt tongue member receiving slot 152 (shown in FIG. 7 only). Since seatbelt assemblies and conventional seatbelt buckle mechanisms, such as the buckle mechanisms 132, are well known, further description of the buckle mechanism 132 is omitted for the sake of brevity.

With the buckle assembly 20 fully assembled, the second pivot pin 134 extends through one of the washers $W_2$, through the first aperture 142 of the anchor plate 130, through a second one of the washers $W_2$, and into the third aperture 108 of the buckle arm 88. The second pivot pin 134 can be provided with threads and threadedly engaged with the aperture 108 or can be a deformable fastener riveted to the buckle arm 88.

The second spring 136 has a first end 160 and a second end 162. The first end 160 extends into the aperture 144 of the anchor plate 130 and the second end 162 engages the stop projection 110. The second spring 136 is positioned to bias the seatbelt buckle 98 in the position depicted in FIGS. 8 and 10 such that the stop projection 140 is spaced apart from the stop projection 110.

Figure 15:
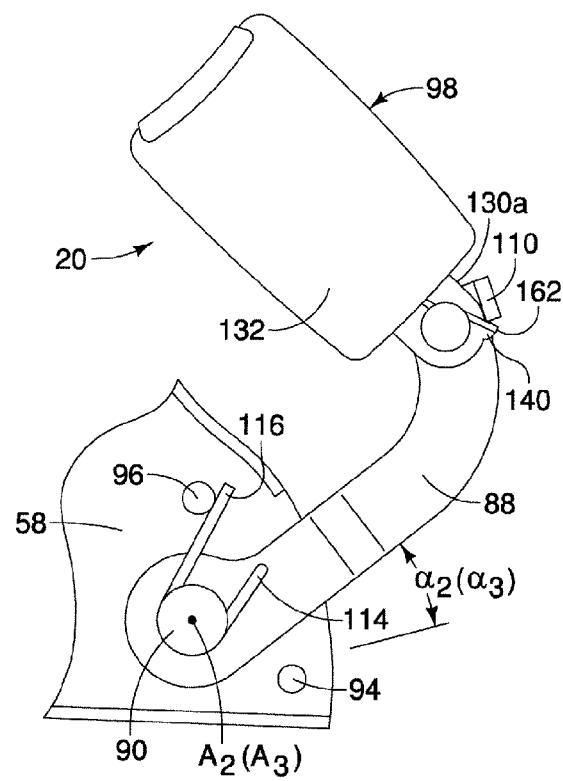
FIG. 15 is another schematic view of the one of the buckle assemblies depicted in FIG. 12, showing the buckle arm in a second position of the pivot movement range and the buckle mechanism in a second position of the buckle movement range in accordance with the first embodiment.

Hence, the buckle mechanism 132 pivots between a forward position (FIG. 14) and an aft position (FIG. 15) relative to the buckle arm 88. Further, the second spring 136 (a biasing member) preferably biases the buckle mechanism 132 toward an intermediate position between the forward position (FIG. 14) and the aft position (FIG. 15). Alternatively, the second spring 136 can bias the buckle mechanism 132 to the forward position.

Consequently, the buckle mechanism 132 is pivotal about a fourth axis $A_4$ defined by the second pivot pin 134 and the second end 102 of the buckle arm 88. The buckle mechanism 132 is pivotal within a range defined by an angle $\alpha_4$ indicated in FIG. 14. The range of pivoting movement of the buckle mechanism 132 within the angle $\alpha_4$ is restricted in both directions by the stop projection 110 of the buckle arm 88. More specifically, a straight side 130a (FIGS. 13 and 14) of the anchor plate 130 contacts the stop projection 110 with the seatbelt buckle 98 in the orientation depicted in FIG. 12 limiting pivotal movement in one rotational direction. Contact between the stop projection 140 and the stop projection 110 limits pivotal movement in the other rotational direction, as indicated in FIG. 15.

The pivoting movement of the buckle arm 88 relative to the seat frame 44 and the pivoting movement of the buckle mechanism 132 relative to the buckle arm 88 allow for overall freedom of movement of the buckle assembly 20. More specifically, the buckle assembly 20 can move in response to movement of the first bottom section 48 of the moveable seat assembly 14.

In particular, for the buckle assembly 20 attached to the first bracket 56, the buckle arm 88 is biased by the first spring 92 such that without the influence of a seatbelt, the buckle mechanism 132 contacts and presses gently against the rearward facing surface 70a of the recess 70 of the first bottom section 48. Similarly, for the buckle assembly 20 attached to the second bracket 58, the buckle mechanism 132 contacts and presses gently against the rearward facing surface 72a of the aperture 72. As the first bottom section 48 moves between the deployed orientation (FIGS. 8 and 10) and the retracted orientation (FIGS. 9 and 11), the buckle mechanism 132 (a seatbelt buckle) contacts the peripheral wall (the rearward facing surface 70a of the recess 70 and the rearward facing surface 72a of the aperture 72). Contact with the respective peripheral walls causes the buckle mechanism 132 to pivot relative to the buckle arm 88, and further causes the buckle arm 88 to pivot relative to the seat frame 44. The movement of the buckle assemblies 20 allows for the majority of each of the buckle mechanisms 132 to remain within respective cutouts (the recess 70 and the aperture 72) throughout the entire movement range of the first seat bottom section 48 as defined by the angle $\alpha_1$.

Further, as shown in FIGS. 8, 9, 10 and 11, the lower surface 82 of the first bottom section 48 defines a bottom plane. During movement of the first bottom section 48 between the deployed orientation and the retracted orientation, the buckle mechanism 132 is maintained above the bottom plane and within respective ones of the recess 70 and the aperture 72.

Hence, the buckle assembly 20 is configured to pivot in response to pivoting movement of the first bottom section 48 (and the second bottom section 52) with the majority of the buckle mechanism 132 being maintained within the recess 70 (and aperture 72) throughout all of the movement range (defined by the angle $\alpha_1$) of the first bottom section 48 (and the movement range of the second bottom section 52). Further, a majority of the buckle assembly 20 as a whole is maintained within the recess 70 (and aperture 72) throughout all of the movement range of the first bottom sections 48 (and the movement range of the second bottom sections 52).

In one embodiment 50% of the buckle mechanism 132 is maintained within the recess 70 and/or the aperture 72. In another alternative embodiment 75% of the buckle mechanism 132 is maintained within the recess 70 and/or the aperture 72.

One intention of the buckle assembly 20 is to provide a rigid buckle arm to maintain position of the buckle mechanism 132 within the cutout (the recess 70 and/or the aperture 72) of the first bottom section 48. Since the axis $A_1$ and the axis $A_2$ are spaced apart from one another, the buckle assembly 20 can pivot relative to its anchor point (axis $A_2$) and travel freely with the first bottom section 48 during movement of the first seat bottom section 48 between the deployed and retracted orientations.

Second Embodiment

Figure 16:
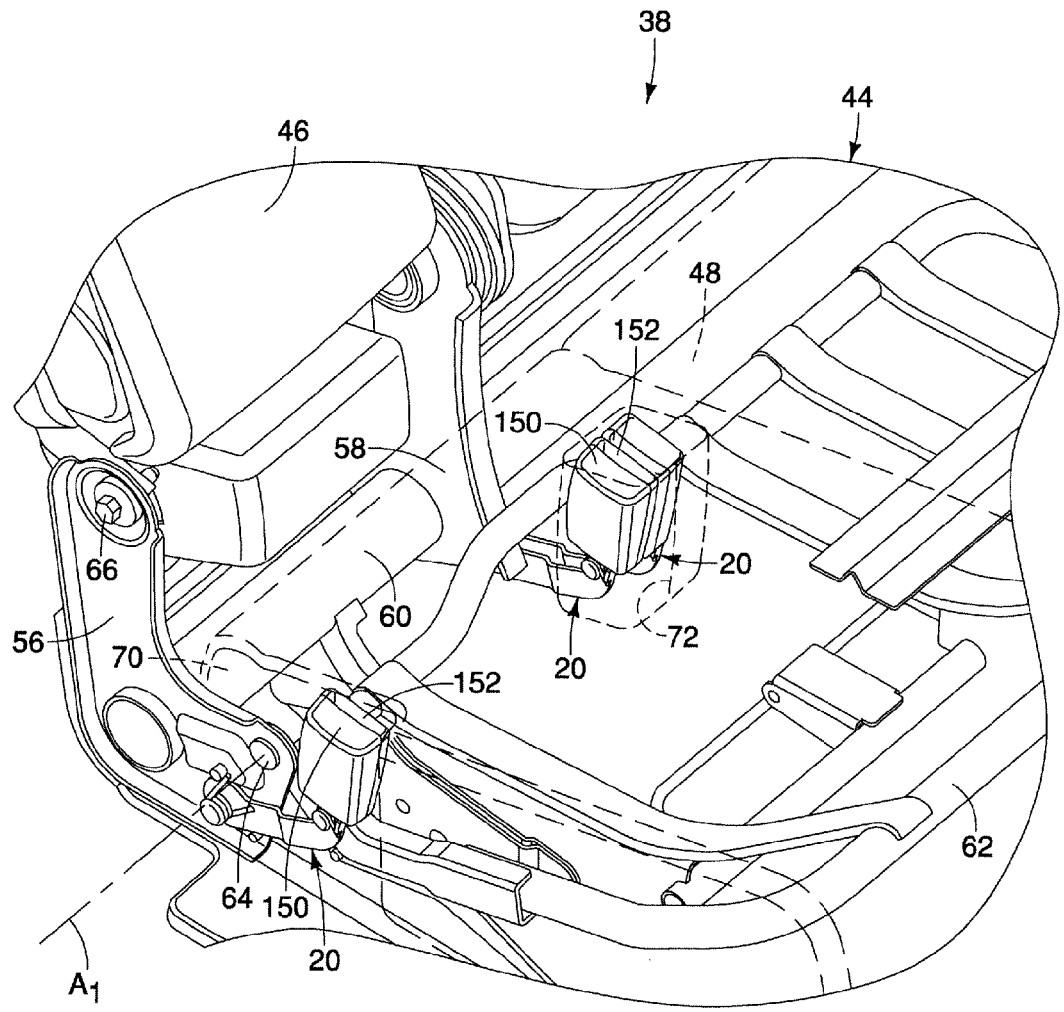
FIG. 16 is another perspective view of a section of the seat assembly similar to FIG. 7, showing buckle arm assemblies in accordance with a second embodiment.

Referring now to FIG. 16, the first sub-assembly 38 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The first sub-assembly 38 is identical to that of the first embodiment and includes the seat frame 44, the first bracket 56, the second bracket 58, the beam 60, the seat bottom support frame 62, the pins 64, the first seatback section 46 and the first bottom section 48. However, in the second embodiment, two buckle assemblies 20 are attached to the second bracket 58. Although not shown, in the second embodiment, the seatbelts $S_1$ and $S_2$ are arranged such that two buckle assemblies 20 are provided to the aperture 72, as shown in FIG. 16, for releasable attachment to the seatbelts $S_1$ and $S_2$.

Third Embodiment

Figure 17:
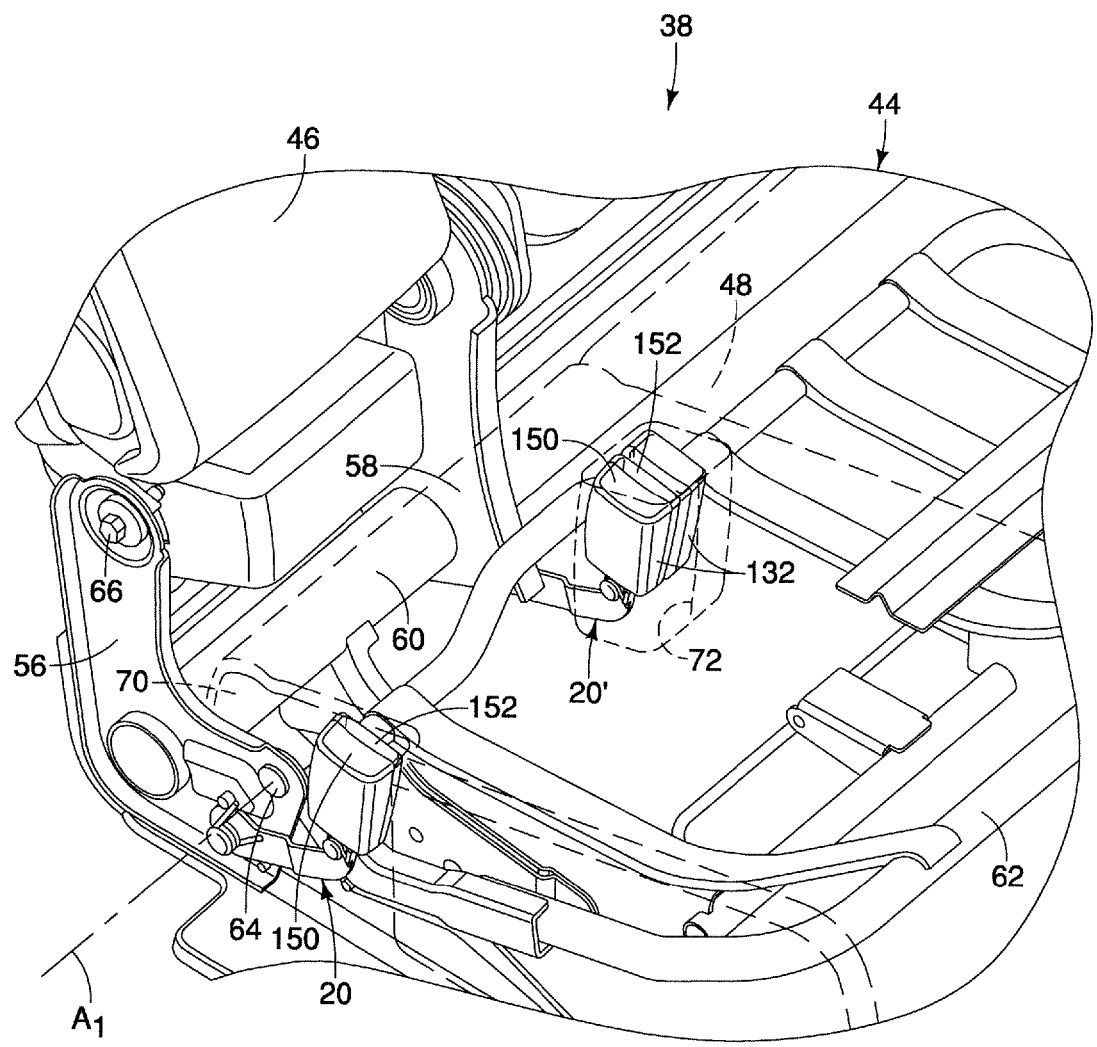
FIG. 17 is another perspective view of a section of the seat assembly similar to FIG. 7, showing buckle arm assemblies in accordance with a third embodiment.

Referring now to FIG. 17, the first sub-assembly 38 with a buckle assembly 20' in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The first sub-assembly 38 is identical to that of the first embodiment and includes the seat frame 44, the first bracket 56, the second bracket 58, the beam 60, the seat bottom support frame 62, the pins 64, the first seatback section 46 and the first bottom section 48. However, in the third embodiment, the buckle assembly 20' includes two buckle mechanisms 132 that are attached to a single buckle arm 88 that is further attached to the second bracket 58 and disposed within the aperture 72.

Fourth Embodiment

Figure 18:
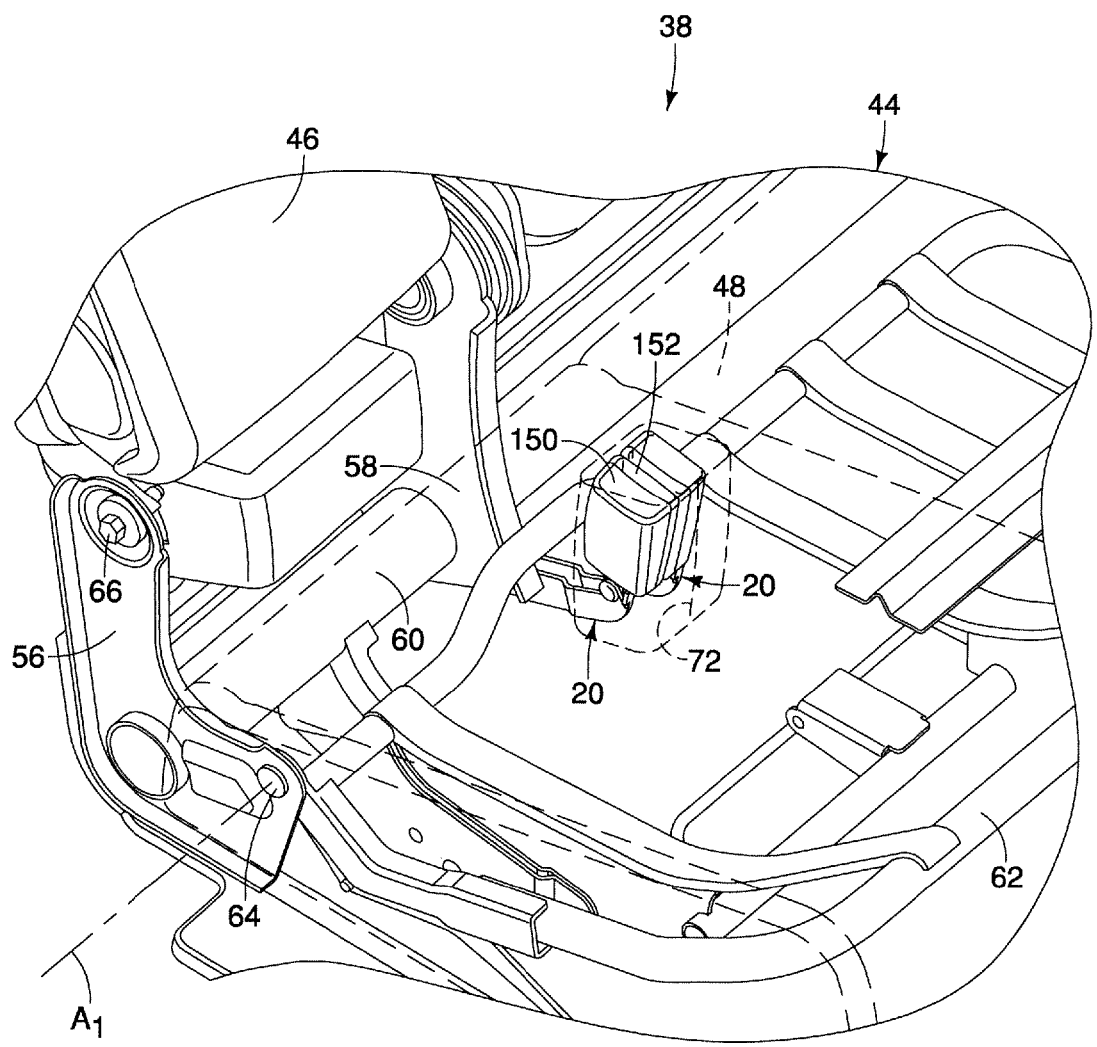
FIG. 18 is another perspective view of a section of the seat assembly similar to FIG. 7, showing buckle arm assemblies in accordance with a fourth embodiment.

Referring now to FIG. 18, the first sub-assembly 38 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

As is apparent from the second and third embodiments, the buckle assemblies 20 can be arranged in any of a variety of locations. The placement of the buckle assemblies 20 is determined by seat orientation, seat configuration and seatbelt location. Depending upon the vehicle design, the seatbelts can be arranged as depicted in FIG. 4, where the seatbelt $S_2$ is used by the passenger seated in the center of the movable seat assembly 14. However, it should be understood from the drawings and the description herein that the orientation of the seatbelt $S_2$ can be reversed such that the seatbelt $S_2$ attaches to one of the buckle assemblies 20 within the aperture 72. With such a seatbelt configuration, the buckle assembly 20 located in the recess 70 can be eliminated.

The first sub-assembly 38 is identical to that of the first embodiment and includes the seat frame 44, the first bracket 56, the second bracket 58, the beam 60, the seat bottom support frame 62, the pins 64, the first seatback section 46 and the first bottom section 48. However, in the fourth embodiment (like the second embodiment), two buckle assemblies 20 are attached to the second bracket 58. Although seatbelts are not shown, the seatbelts $S_1$ and $S_2$ are arranged such that two buckle assemblies 20 are provided to the aperture 72, as shown in FIG. 18 for releasable attachment to the seatbelts $S_1$ and $S_2$. Further, the first seat bottom section 48 is modified slightly in that the recess 70 has been eliminated, as shown in FIG. 18. However, the recess 74 (see FIG. 5) in the second sub-assembly 40 (see FIG. 5) includes one of the buckle assemblies 20 for releasable attachment to the seatbelt $S_3$ in a manner similar to that shown in FIG. 4.

There are many conventional automotive components, such as seatbelts and vehicle structural components that are well known in the art. Since these components are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle seat assembly. Accordingly, these terms, as utilized to describe the present invention should be interpreted relative to a vehicle equipped with the vehicle seat assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle seat assembly comprising:
a frame member including a cross member and a bracket;
a seat bottom pivotally attached to the bracket at a first location for pivotal movement about a first axis within a movement range defined between a seating position and a retracted position in which the seat bottom angles upward away from the seating position, the seat bottom having an upper surface, a lower surface, a forward edge, a rearward edge and a cutout defined by a rearward facing surface that extends from the upper surface to the lower surface at a location forward of the rearward edge and rearward from the forward edge;
a buckle assembly including a buckle arm and a seatbelt buckle, the buckle arm including a first end pivotally attached to the bracket at a second location for pivotal movement relative to the bracket about a second axis between a seating position corresponding to the seating position of the seat bottom and a retracted position corresponding to the retracted position of the seat bottom, the first axis extending through the first location and the second axis extending through the second location, the second location being spaced vertically lower and horizontally rearward of the first location, the seatbelt buckle being coupled to a second end of the buckle arm, the buckle assembly pivoting in response to contact between the seatbelt buckle and the rearward facing surface of the cutout and pivoting movement of the seat bottom with the majority of the seatbelt buckle being maintained within the cutout throughout all of the movement range of the seat bottom from the seating position to the retracted position.

2. The vehicle seat assembly according to claim 1, wherein the cutout is dimensioned such that the cutout completely encircles the seatbelt buckle with the seatbelt buckle positioned within the cutout.

3. The vehicle seat assembly according to claim 1, wherein the seat bottom includes an aperture that extends from the upper surface to the lower surface, the aperture further defining the cutout.

4. The vehicle seat assembly according to claim 3, wherein the buckle assembly includes a second seatbelt buckle on the buckle arm, with the majority of both of the seatbelt buckle and second seatbelt buckle being maintained within the cutout throughout all of the movement range of the seat bottom.

5. The vehicle seat assembly according to claim 3, further comprising
a second buckle assembly including a second buckle arm and a second seatbelt buckle, the second buckle arm including a first end pivotal relative to the frame member about a third axis, the second seatbelt buckle being attached to a second end of the second buckle arm such that the majority of the second seatbelt buckle is positioned within the cutout throughout all of the movement range of the seat bottom.

6. The vehicle seat assembly according to claim 1, wherein the seat bottom includes a first lateral edge, with a recess formed along the first lateral edge, the recess at least partially defining the cutout.

7. The vehicle seat assembly according to claim 6, wherein the recess is defined by the rearward facing surface and a lateral facing surface that extends from the rearward edge to the rearward facing surface.

8. The vehicle seat assembly according to claim 6, wherein the cutout is further defined by a second lateral edge of a second seat bottom positioned adjacent to the seat bottom with the seat bottom and the second seat bottom in the seating position.

9. The vehicle seat assembly according to claim 1, wherein
the movement range of the seat bottom defines a first angle measured between the seating position and the retracted position of the seat bottom, and
the buckle arm is pivotal about the second axis within a second movement range measured between the seating and retracted positions of the buckle arm, the second movement range defining a second angle, and the first angle being greater than the second angle.

10. The vehicle seat assembly according to claim 9, wherein
the bracket includes a first stop and a second stop, the first stop being positioned to limit pivoting movement of the buckle arm in a first direction and the second buckle arm stop being positioned to limit pivoting movement of the buckle arm in a second direction relative to the second axis, the first and second stops thereby defining limits of the second movement range.

11. The vehicle seat assembly according to claim 1, wherein
the seatbelt buckle is pivotally connected to the second end of the buckle arm for pivotal movement about a third axis that extends through the second end of the buckle arm.

12. The vehicle seat assembly according to claim 11, wherein
the seatbelt buckle pivots between a forward position and an aft position relative to the buckle arm.

13. The vehicle seat assembly according to claim 11, wherein the seatbelt buckle includes a biasing member that biases the seatbelt buckle toward an intermediate position between the forward position and the aft position.

14. The vehicle seat assembly according to claim 1, wherein
the rearward facing wall is positioned forward of the seatbelt buckle.

15. The vehicle seat assembly according to claim 1, wherein
the buckle assembly includes a biasing member that biases the buckle arm toward the seating position.

16. The vehicle seat assembly according to claim 1, wherein
the lower surface of the seat bottom defines a bottom plane, and the buckle arm maintains the position of the seatbelt buckle above the bottom plane.

17. A vehicle seat assembly comprising:
a frame member including a cross member and a bracket;
a seatback section directly attached to the frame member and extending upward from the frame member with the seatback section in an upright orientation;
a seat bottom pivotally attached to the bracket at a first location for pivotal movement with respect to the bracket about a first axis within a movement range defined between a seating position and a retracted position exposing an area under the seat bottom, the first axis extending through a portion of the frame member, the seat bottom having a forward edge, a rearward edge, an upper surface and a lower surface with a cutout defined by a surface that extends from the upper surface to the lower surface, the surface being located forward of the rearward edge and rearward of the forward edge; and
a first buckle assembly including a first buckle arm and a first seatbelt buckle, the first buckle arm including a first end pivotally attached to the bracket at a second location spaced from the first location for pivotal movement about a second axis between a seating position corresponding to the seating position of the seat bottom and a retracted position corresponding to the retracted position of the seat bottom, the first axis extending through the first location and the second axis extending through the second location, with the second location being spaced vertically lower and horizontally rearward of the first location, the first seatbelt buckle being coupled to a second end of the first buckle arm, the first buckle assembly pivoting in response to contact between the first seatbelt buckle and the surface of the cutout and pivoting movement of the seat bottom between the seating position and the retracted position with the majority of the seatbelt buckle being maintained within the recess throughout all of the movement range of the seat bottom.

18. The vehicle seat assembly according to claim 17, wherein
the cutout is a recess located adjacent to a first lateral edge of the upper surface of the seat bottom such that the surface of the cutout further extends from the first lateral edge toward a second lateral edge of the upper surface of the seat bottom.

19. The vehicle seat assembly according to claim 18, wherein the seat bottom includes an aperture that extends from the upper surface to the lower surface at a location spaced apart from the first lateral edge and the second lateral edge, and the vehicle seat assembly further comprising:

a second buckle assembly including a second buckle arm and a second seatbelt buckle, the second buckle arm including a first end coupled to the frame member for pivotal movement about a third axis between a seating position corresponding to the seating position of the seat bottom and a retracted position corresponding to the retracted position of the seat bottom, the second seatbelt buckle being coupled to a second end of the second buckle arm, the second buckle assembly being configured to pivot in response to pivoting movement of the seat bottom between the seating position and the retracted position with the majority of the seatbelt buckle being maintained within the aperture throughout all of the movement range of the seat bottom.

20. The vehicle seat assembly according to claim 17, wherein the seatback section is pivotally connected to the frame member for pivotal movement with respect to the frame member about a seatback pivot axis, the seatback pivot axis being spaced apart from the first axis.

21. A vehicle seat assembly comprising:

a frame member including a cross member and a bracket;

a seat bottom pivotally attached to the bracket for pivotal movement at a first location about a first axis within a first movement range defined between a seating position and a retracted position in which the seat bottom angles upward away from the seating position, the seat bottom having an upper surface and a lower surface, the seat bottom defining a cutout being at least partially defined by a surface that extends from the upper surface to the lower surface of the seat bottom;

a buckle assembly including a buckle arm and a seatbelt buckle, the buckle arm including a first end pivotally attached to the bracket at a second location spaced apart from the first location for pivotal movement about a second axis within a second movement range defined between a first position and a second position, the first axis extending through the first location and the second axis extending through the second location, the second location being spaced vertically lower and horizontally rearward of the first location, the seatbelt buckle being coupled to a second end of the buckle arm, the seatbelt buckle contacting the surface of the cutout during movement of the seat bottom between the seating position and the retracted position such that the buckle assembly is in the first position with the seat bottom in the seating position and the buckle assembly is in the second position with the seat bottom in the retracted position, the first movement range defining a first angle and the second movement range defining a second angle that is smaller than the first angle.

22. The vehicle seat assembly according to claim 21, wherein the first axis is parallel to the second axis.

23. The vehicle seat assembly according to claim 21, wherein the buckle assembly is biased to move from the second position toward the first position such that the seatbelt buckle is biased into contact with the surface of the cutout.

24. The vehicle seat assembly according to claim 21, further comprising a seatback section directly pivotally connected to the frame member and extending upward from the frame member with the seatback section in an upright orientation, and the seat bottom is directly pivotally connected to the frame member.

* * * * *